US008625501B2

(12) United States Patent
Song

(10) Patent No.: US 8,625,501 B2
(45) Date of Patent: Jan. 7, 2014

(54) REGULATING BROADCAST OVERHEAD MESSAGES WITHIN A WIRELESS COMMUNICATIONS NETWORK

(75) Inventor: Bongyong Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 631 days.

(21) Appl. No.: 12/233,039

(22) Filed: Sep. 18, 2008

(65) Prior Publication Data

US 2009/0080362 A1    Mar. 26, 2009

Related U.S. Application Data

(60) Provisional application No. 60/974,809, filed on Sep. 24, 2007.

(51) Int. Cl.
*H04H 20/71* (2008.01)
*H04W 4/00* (2009.01)
*H04J 3/26* (2006.01)
*H04J 4/00* (2006.01)
*H04B 7/00* (2006.01)

(52) U.S. Cl.
USPC ........... 370/329; 370/312; 370/341; 370/432; 370/436; 455/518

(58) Field of Classification Search
None
See application file for complete search history.

(56) References Cited

U.S. PATENT DOCUMENTS

| 5,883,885 A | 3/1999 | Raith |
| 2003/0114156 A1 | 6/2003 | Kinnavy |
| 2003/0148785 A1 | 8/2003 | Mangal et al. |
| 2005/0111394 A1 | 5/2005 | Jung et al. |
| 2006/0182058 A1* | 8/2006 | Jeong et al. ................... 370/329 |
| 2006/0246924 A1 | 11/2006 | Balasubramanian et al. |
| 2006/0253442 A1 | 11/2006 | Rhee et al. |
| 2007/0049314 A1* | 3/2007 | Balachandran et al. ...... 455/518 |
| 2007/0058628 A1 | 3/2007 | Palnati et al. |
| 2007/0281722 A1 | 12/2007 | Gao |
| 2009/0080364 A1 | 3/2009 | Song et al. |
| 2013/0136051 A1 | 5/2013 | Song |

FOREIGN PATENT DOCUMENTS

| EP | 1734714 | 12/2006 |
| JP | 2004187279 A | 7/2004 |
| JP | 2005533414 A | 11/2005 |
| JP | 2006518125 A | 8/2006 |

(Continued)

OTHER PUBLICATIONS

International Preliminary Report on Patentability, PCT/US2008/077524, International Bureau, The International Bureau of WIPO, Apr. 1, 2010.

(Continued)

*Primary Examiner* — Kwang B Yao
*Assistant Examiner* — Jutai Kao
(74) *Attorney, Agent, or Firm* — James T. Hagler; Raphael Freiwirth

(57) ABSTRACT

Aspects of regulating broadcast overhead messages within a wireless communications network are disclosed. In an example, an access network periodically sends a message advertising an announced multicast session on each of a plurality of carriers, the message indicating that the announced multicast session is being carried on a target carrier among the plurality of carriers. The access network determines whether to cease transmission of the periodic message within each non-target carrier based on a number of times the periodic message has been sent in each of the plurality of carriers, and ceases transmission of the periodic message within each non-target carrier based on the determining step.

25 Claims, 6 Drawing Sheets

(56) References Cited

FOREIGN PATENT DOCUMENTS

| JP | 2006339893 A | 12/2006 |
|---|---|---|
| JP | 2006340129 A | 12/2006 |
| JP | 2006528456 A | 12/2006 |
| JP | 2007516657 A | 6/2007 |
| JP | 2007518290 T | 7/2007 |
| KR | 20040065284 | 7/2004 |
| RU | 2003131395 A | 4/2005 |
| WO | WO2004051926 A1 | 6/2004 |
| WO | 2004075416 A2 | 9/2004 |
| WO | WO2005015776 A1 | 2/2005 |
| WO | WO2006087067 A1 | 8/2006 |
| WO | 2006/109961 | 10/2006 |
| WO | WO2007059791 A1 | 5/2007 |
| WO | WO2007127114 A1 | 11/2007 |

OTHER PUBLICATIONS

"3GGP2 C. S0054-a, Version 1.0, cdma2000 High Rate Broadcast-Multicast Packet Data Air Interface Specification" 3rd Generation Partnership Project 2 "3GPP2", Feb. 14, 2006, pp. 1-69, XP002520330.

International Search Report, PCT/US2008/077524, International Searching Authority, European Patent Office, Apr. 17, 2009.

Written Opinion, PCT/US2008/077524, International Searching Authority, European Patent Office, Apr. 17, 2009.

\* cited by examiner

REGULATING BROADCAST OVERHEAD MESSAGES WITHIN A WIRELESS COMMUNICATIONS NETWORK

CLAIM OF PRIORITY UNDER 35 U.S.C. §119

The present Application for Patent claims priority to Provisional Application No. 60/974,809, entitled "METHODS OF REGULATING BROADCAST OVERHEAD MESSAGES WITHIN A WIRELESS COMMUNICATIONS NETWORK", filed Sep. 24, 2007, which is assigned to the assignee hereof and hereby expressly incorporated by reference herein in its entirety.

BACKGROUND OF THE INVENTION

1. Field of the Invention

The invention relates to communications in a wireless telecommunication system and, more particularly to methods of regulating broadcast overhead messages within a wireless communications network.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communication network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a cell or sector), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The 3$^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

Embodiments of the present invention are directed to regulating broadcast overhead messages within a wireless communications network. In an example, an access network periodically sends a message (e.g., a broadcast overhead message) advertising an announced multicast session on each of a plurality of carriers, the message indicating that the announced multicast session is being carried on a target carrier among the plurality of carriers. The access network determining whether to cease transmission of the periodic message within each non-target carrier based on a number of times the periodic message has been sent in each of the plurality of carriers, and ceases transmission of the periodic message within each non-target carrier based on the determining step. An access terminal (e.g., missing the initial message(s)) determines that the access network has ceased transmission, on a carrier to which the access terminal is currently tuned, of the periodic message. The access terminal sends, to the access network, a request for the access network to retransmit the periodic message, and receives a re-transmission of the periodic message from the access network.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
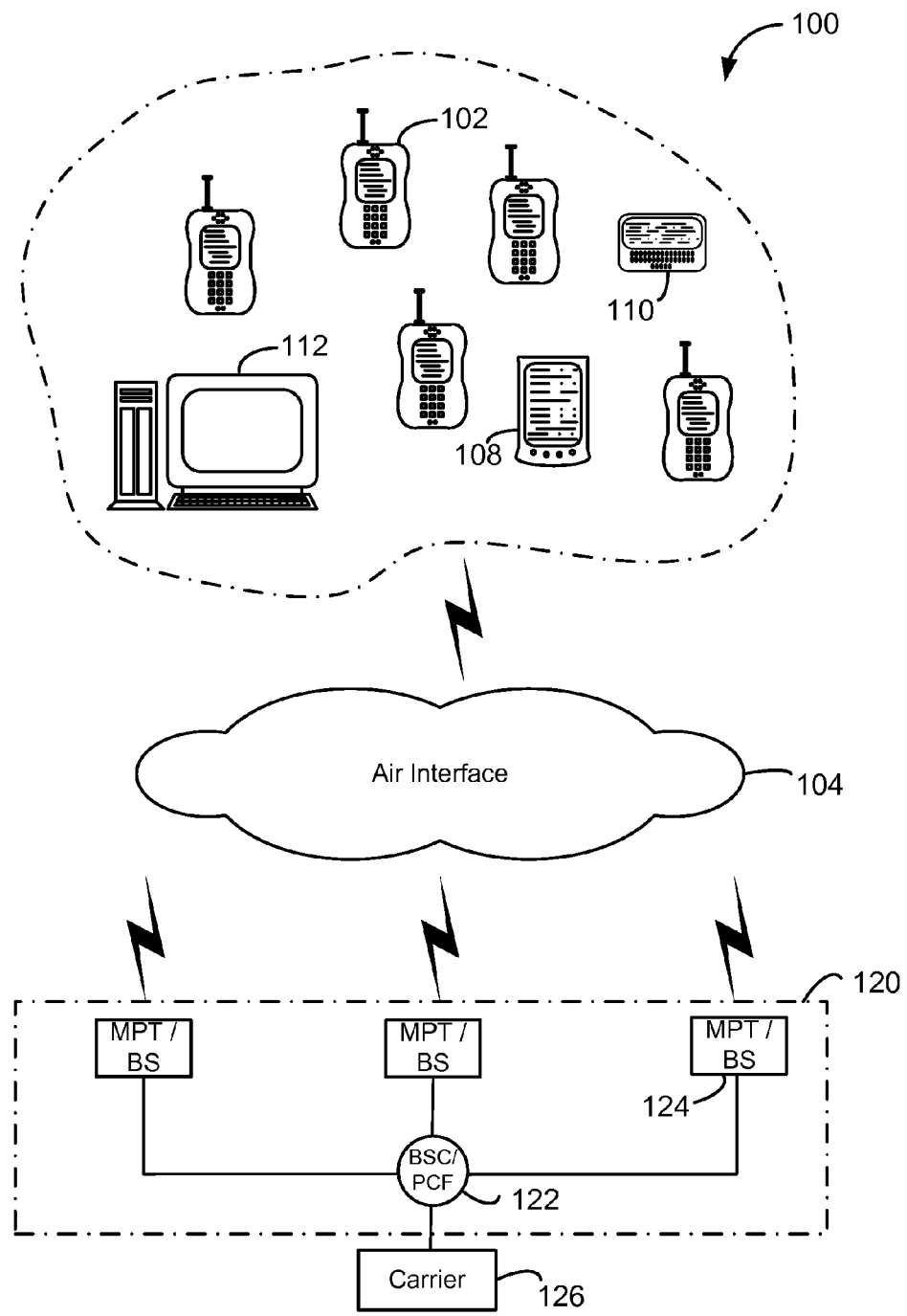
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless communication system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
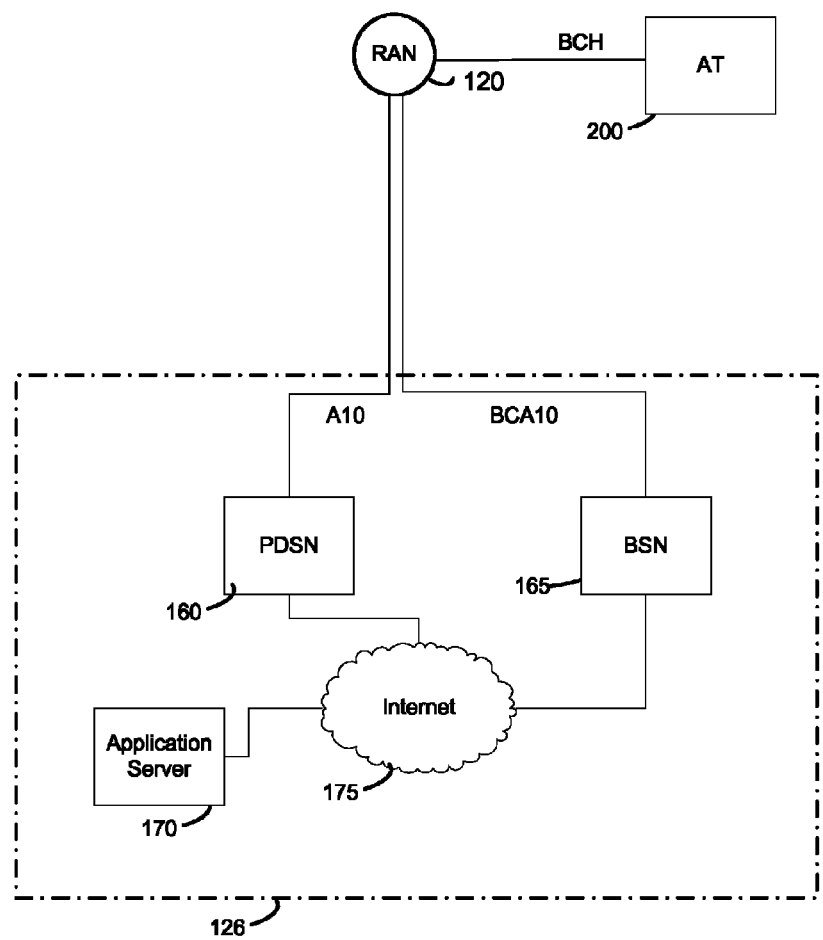
FIG. 2 illustrates the carrier network according to an embodiment of the present invention.

FIG. 2 illustrates the carrier network 126 according to an embodiment of the present invention. In the embodiment of FIG. 2, the carrier network 126 includes a packet data serving node (PDSN) 160, a broadcast serving node 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 connection. The A10 connection is well-known in the art and will not be described further for the sake of brevity.

Referring to FIG. 2, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 3:
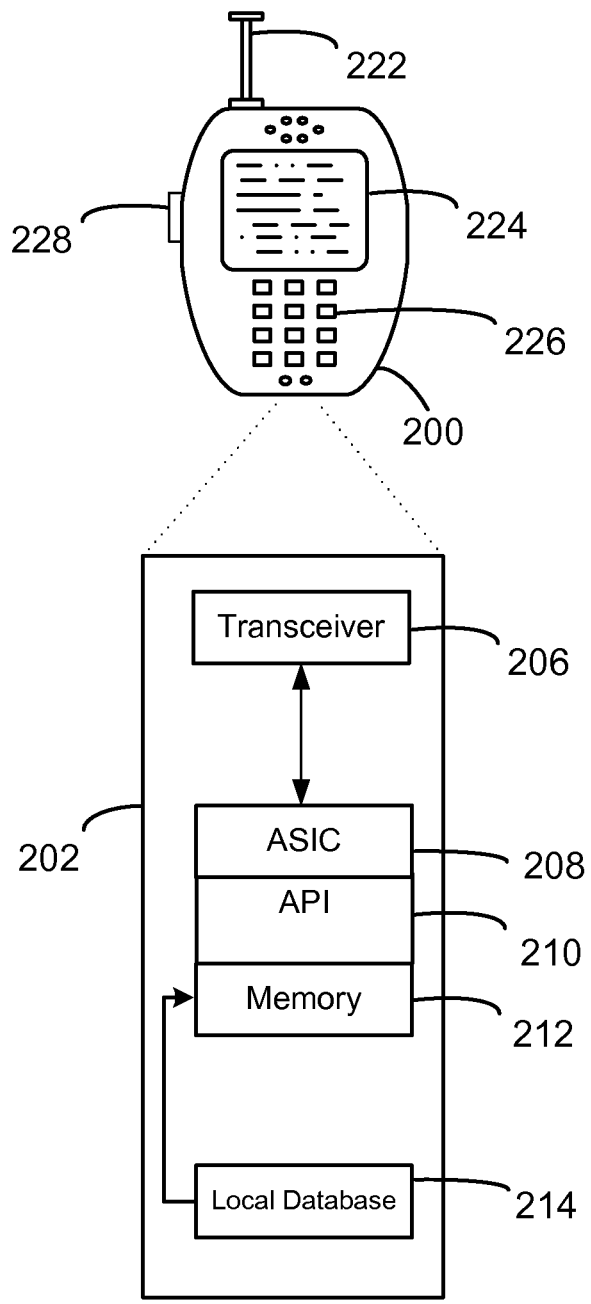
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

Conventional Multicast Messaging Process

In conventional wireless communication systems, such as code division multiple access (CDMA) wireless communication systems, the total amount of available bandwidth is divided into different carriers. For example, each carrier can be allocated the same amount of bandwidth (although this is not necessarily the case). Generally, the RAN 120 seeks to distribute load substantially evenly across each of the carriers to avoid an overload condition on any particular carrier.

As discussed in the Background section, multicasts or multicast sessions permit transmission of the same message or set of messages to a relatively large number of access terminals, or multicast group members. Accordingly, it will be appreciated that carrying multicast messages for a particular multicast session on more than one of the available carriers in a particular sector is redundant, and wastes precious bandwidth within the wireless communication system. As such, it is well-known to transmit the multicast messages for a particular multicast session on a single carrier within each sector, and have access terminals desiring to participate in the multicast session switch to that carrier.

Figure 4:
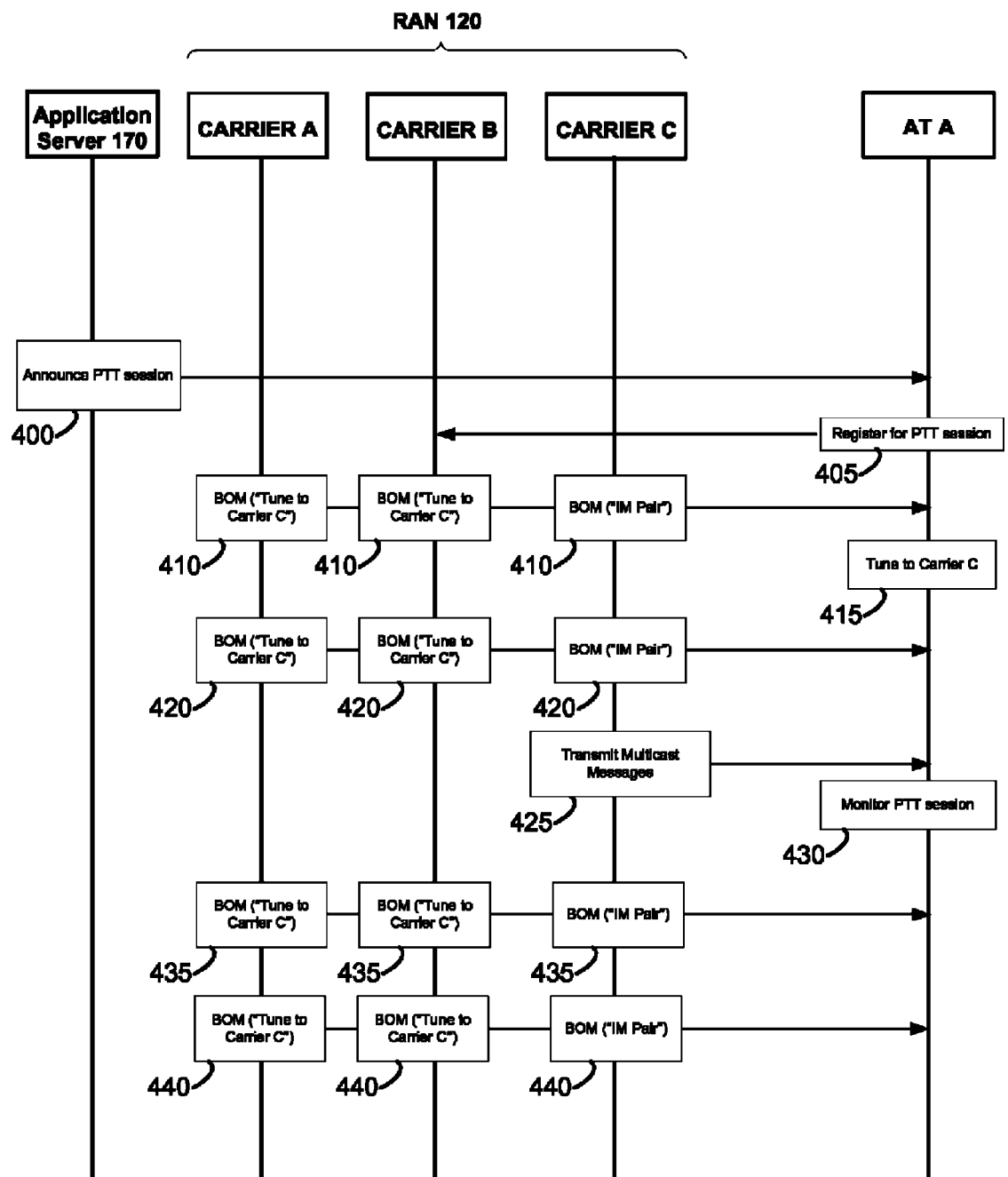
FIG. 4 illustrates a conventional multicast messaging process.

FIG. 4 illustrates a conventional multicast messaging process. In particular, FIG. 4 illustrates a conventional manner that a given access terminal joins an announced push-to-talk (PTT) session on a given carrier. In the description of FIG. 4, reference is made to carriers A, B and C. However, it will be appreciated that wireless communication systems may include any number of carriers, and the description of FIG. 4 references three carriers (i.e., A, B and C) for convenience of explanation.

In 400, the application server 170, or push-to-talk (PTT) server, sends an announce message announcing a PTT session to the RAN 120, which transmits the announce message in a plurality of sectors of the wireless communication system 100 and on each available carrier within each sector. Thus, the announce message is transmitted on each of carriers A, B and C to AT A.

In 405, assume that AT A is interested in participating in the PTT session (e.g., AT A wants to speak to the multicast group for the announced PTT session, AT A wants to listen/watch the announced PTT session, etc.). Thus, in 405, AT A attempts to register to the announced PTT session by sending a registration message, such as a BCMCSFlowRegistration message as defined by 1x EV-DO standards, to the RAN 120. In 410, the RAN 120 receives the BCMCSFlowRegistration message from AT A and sends a broadcast overhead message (BOM), on each of carriers A, B and C, advertising the announced PTT session on a downlink control channel in one or more slots of the downlink control channel that are reserved for BOMs. BOMs are well-known in the art and defined by 1x EV-DO standards. BOMs include a listing of one or more broadcast and multicast service (BCMCS) flow identifiers (IDs), with instructions regarding how an access terminal can "tune" to the advertised BCMCS flow on a downlink broadcast channel. For example, BOMs sent in carriers other than the carrier on which the multicast session is being supported ("non-target carriers", e.g., carriers A and B) inform ATs that the advertised BCMCS flow is carried on another carrier ("target carrier", e.g., carrier C), and the BOM sent in the target carrier indicates an interlace-multiplex pair of the downlink broadcast channel that includes the multicast session messaging within that carrier. Thus, if an AT is monitoring a non-target carrier, the AT must (i) decode the BOM on the non-target carrier, (ii) tune to the indicated target carrier, (iii) decode the BOM on the target carrier and (iv) decode downlink transmissions in the indicated IM pair, as will be described below in greater detail.

Accordingly, in 415, assume that the BOM advertising the BCMCSFlowID for the announced PTT session indicates that the announced PTT session is being carried on carrier C. Thus, AT A either (i) tunes to carrier C directly (ii) or, if AT A has an active traffic channel on a carrier other than carrier C, AT A determines whether to drop the active traffic channel in order to tune to carrier C for the announced PTT session. For convenience of explanation, assume that AT A tunes to carrier C directly in 415.

In 420, the RAN 120 re-sends, at a next reserved BOM slot, the BOMs in carriers A and B (e.g., including instructions to tune to carrier C to join the multicast session) and carrier C (e.g., including IM pair information for monitoring multicast communications in carrier C).

In 425, the RAN 120 sends multicast messages associated with the announced PTT session on carrier C (e.g., on a downlink broadcast channel) on the indicated IM pair, and AT A begins to monitor the PTT session, 430. The BOMs advertising the BCMCSFlowID for the announce PTT session are configured to be sent at a periodic interval ("BOM interval") during the PTT session at the reserved BOM slot(s) of the downlink control channel on each available carrier (i.e., carriers A, B and C). Accordingly, the BOM advertising the announced PTT session is re-sent in 435, 440, and so on, throughout the given multicast session, on each available carrier.

As will be appreciated by one of ordinary skill in the art, sending the BOM for the announced PTT session on carriers other than the carrier on which the given multicast session or PTT session is being hosted ("target carrier") becomes less and less beneficial with continued iterations of BOM transmissions because most ATs have already tuned to the target carrier, or else have decided to ignore the announced PTT session altogether. Thus, after a given number of intervals, BOMs sent on carriers other than the target carrier do not typically result in many ATs switching to the target carrier, and as such these BOMs waste precious system resources on the downlink control channel and also increase the level of interference in the wireless communication system.

As discussed above with respect to FIG. 4, sending the BOM repeatedly on non-target carriers throughout the duration of a PTT session can waste precious system resources on the downlink control channel and also increase the level of interference in the wireless communication system. Accordingly, embodiments of the present invention are directed to regulating the BOM on non-target carriers, as will now be described in greater detail with respect to FIG. 5.

Figure 5:
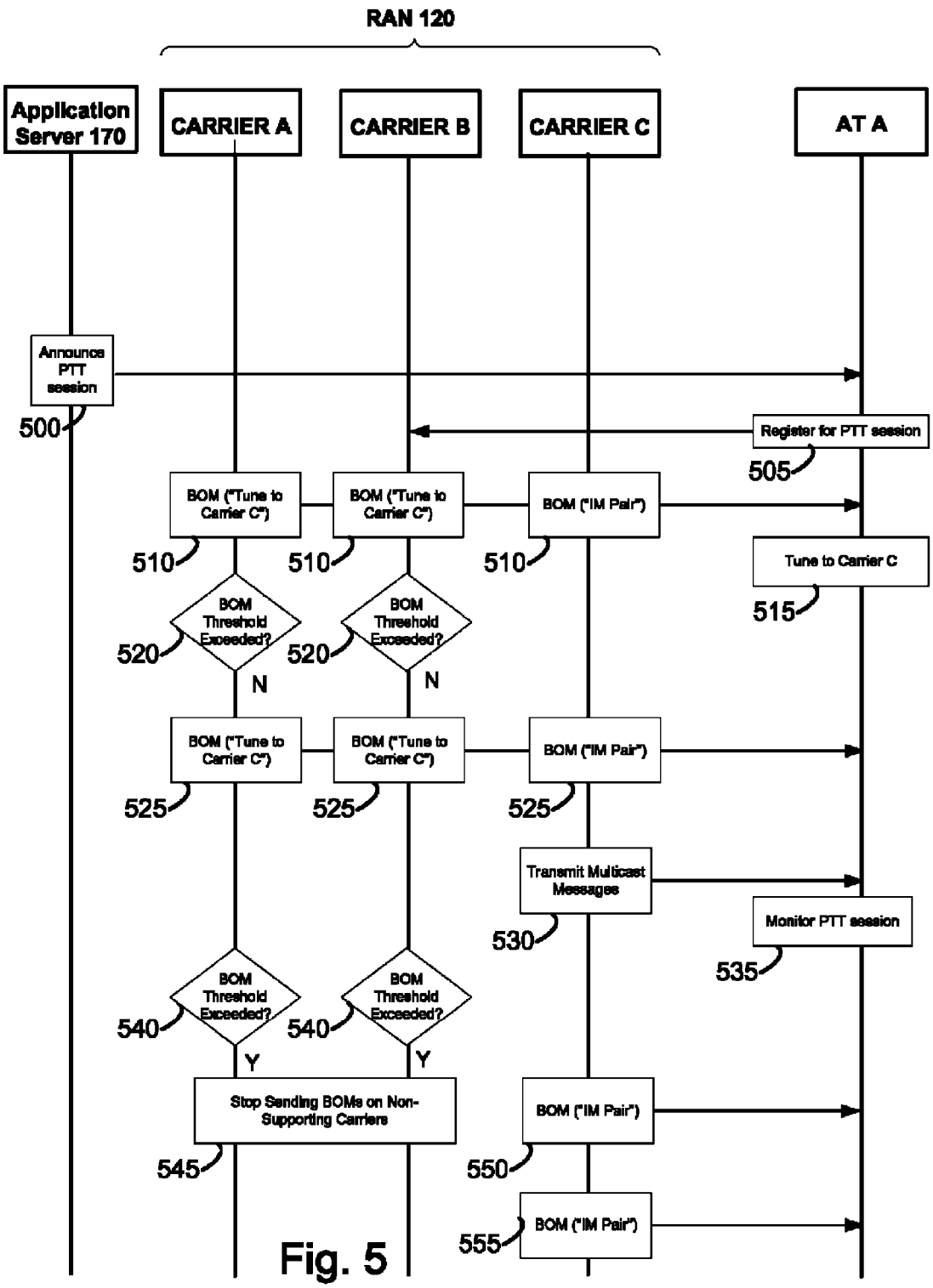
FIG. 5 illustrates BOM regulation during a multicast messaging process according to an embodiment of the present invention.

FIG. 5 illustrates BOM regulation during a multicast messaging process according to an embodiment of the present invention. In the description of FIG. 5, reference is made to carriers A, B and C. However, it will be appreciated that wireless communication systems may include any number of carriers, and the description of FIG. 4 references three carriers (i.e., A, B and C) for convenience of explanation.

In 500, the application server 170, or push-to-talk (PTT) server, sends an announce message announcing a PTT session to the RAN 120, which transmits the announce message in a plurality of sectors of the wireless communication system 100 and on each available carrier within each sector. Thus, the announce message is transmitted on each of carriers A, B and C to AT A.

In 505, assume that AT A is interested in participating in the PTT session (e.g., AT A wants to speak to the multicast group for the announced PTT session, AT A wants to listen/watch the announced PTT session, etc.). Thus, in 505, AT A attempts to register to the announced PTT session by sending a registration message, such as a BCMCSFlowRegistration message as defined by 1×EV-DO standards, to the RAN 120. In 510, the RAN 120 receives the BCMCSFlowRegistration message from AT A and sends a broadcast overhead message (BOM), on each of carriers A, B and C, advertising the announced PTT session on a downlink control channel in one or more slots of the downlink control channel that are reserved for BOMs. As discussed above, BOMs are well-known in the art and defined by 1×EV-DO standards. BOMs include a listing of one or more broadcast and multicast service (BCMCS) flow identifiers (IDs), with instructions regarding how an access terminal can "tune" to the advertised BCMCS flow.

In 515, assume that the BOMs advertising the BCMCSFlowID for the announced PTT session in non-target carriers (i.e., carriers A and B) indicates that the announced PTT session is being carried on carrier C, and the BOM sent in the target carrier (i.e., carrier C) includes an IM pair for tuning to the multicast session within that carrier. Thus, AT A either (i) tunes to carrier C (ii) or, if AT A has an active traffic channel on a carrier other than carrier C, AT A determines whether to risk dropping the active traffic channel in order to tune to carrier C for the announced PTT session or (iii) is already tuned to carrier C and simply begins monitoring the multicast session on the indicated IM pair. For convenience of explanation, assume that AT A tunes to carrier C in 515.

In 520, the RAN 120 determines whether the number of times the BOM for the announced PTT session has been sent exceeds a BOM threshold. For example, the BOM threshold may be determined as a tradeoff between (i) the number of new users expected to switch to carrier C to participate in the announced PTT session after a given number of iterations of BOM transmissions on multiple carriers versus (ii) the amount of interference and/or the amount of bandwidth lost on the downlink control channel due to the BOMs sent in non-target carriers. For example, the BOM threshold can be equal to 2, 3, etc. For example, the BOM threshold can be selected by a system designer to satisfy a given performance criteria, such as ensuring that a given percentage (e.g., 99%) of multicast group members that are (i) capable of receiving the BOM and (ii) desiring to tune to the PTT session tune to the carrier hosting the PTT session (i.e., carrier C).

In 520, assume that the RAN 120 determines that the BOM threshold has not been exceeded, and the process advances to 525. As noted above, BOMs advertising the BCMCSFlowID for the announce PTT session are configured to be sent at a periodic interval ("BOM interval") during the PTT session at the reserved BOM slot(s) of the downlink control channel. Accordingly, the BOM is sent again on each of carriers A, B and C in 525. Thus, because AT A has now tuned to carrier C, AT A receives the BOM with the IM pair for the multicast session within that carrier.

As discussed above, for an AT that is tuned to a non-target carrier, two BOMs may be required before the AT can monitor the multicast session on the target carrier. A first BOM informs that AT that the multicast session is being carried on another carrier, and after tuning to that carrier, a second BOM informs that AT with regard to which IM pair the multicast session is being transmitted on in the downlink BCH. Accordingly, in an embodiment of the present invention, instead of sending the first two BOMs on the periodic, reserved BOM slot of the downlink control channel, the first two BOMs are sent on the earliest two synchronous and/or subsynchronous control channel capsules of the downlink control channel in order to reduce call setup times. As will be appreciated, in this example, ATs can be configured in order to monitor the downlink control channel for BOMs as soon as the announce message is received, and not merely at the reserved BOM slot(s) of the downlink control channel. A further discussion of ATs being configured to monitor the downlink control slot in a more aggressive manner subsequent to receipt of an announce message is provided within co-pending U.S. Provisional Application No. 60/974,829 by Song et al., entitled "METHODS OF SUPPORTING A MULTICAST SESSION WITHIN A WIRELESS COMMUNICATIONS NETWORK", filed Sep. 24, 2007, which is assigned to the assignee hereof and hereby expressly incorporated by reference herein in its entirety. However, to support legacy ATs that may not necessarily be configured in this manner, the RAN 120 can also send at least two BOMs in the conventional BOM slots of the downlink control channel. These considerations can be taken into account when determining the BOM threshold, for example.

In 530, the RAN 120 sends multicast messages associated with the announced PTT session on carrier C at the indicated IM pair of the downlink broadcast channel, and AT A begins to monitor the PTT session, 535.

While not shown explicitly within FIG. 5, each time the BOM is sent on each carrier (e.g., during call set-up), the RAN 120 increments a counter that keeps track of the number of times the BOM has been sent on each carrier. Thus, the counter is incremented after 535. In 540, the RAN 120 again determines whether the number of times the BOM for the announced PTT session has been sent (i.e., the value of the counter) exceeds a BOM threshold. Here, assume that the RAN 120 determines that the BOM threshold is exceeded by the counter value.

Accordingly, in 545, the RAN 120 determines to stop sending the BOM on each available carrier at the periodic BOM intervals, and instead limits the periodic BOM transmissions to the target carrier (i.e., carrier C). Thus, the BOM is sent on carrier C exclusively in 550, 555, and so on, for the remainder of the PTT session.

Alternatively, while not illustrated explicitly within FIG. 5, subsequent to 545, the BOM need not cease transmission on non-target carriers altogether, but rather can be configured to be transmitted on non-target carriers less frequently than on the target carrier. Thus, in this alternative example, ATs tuned to non-target carriers are granted at least one additional chance to tune to the announced PTT session, while system interference and/or downlink control channel usage is still reduced as compared to the conventional art.

In another example, instead of simply abandoning ATs that miss the BOMs before the BOM threshold is exceeded, or relying upon an infrequently transmitted BOM after the BOM threshold is exceeded, protocols may be provided wherein non-target carrier BOMs can be specially requested by one or more ATs in non-target carriers, as will now be described in greater detail with respect to FIG. 6.

Figure 6:
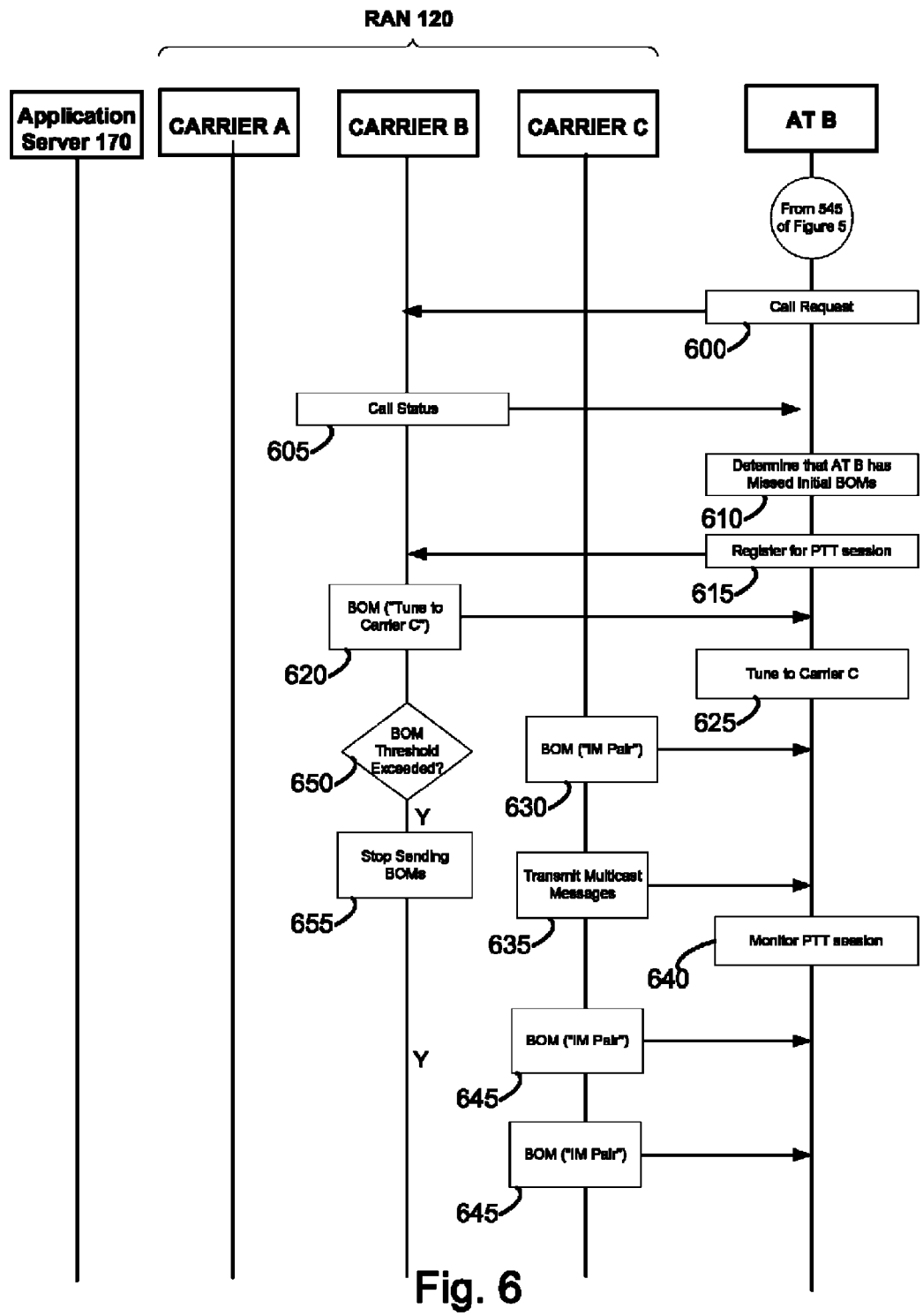
FIG. 6 illustrates a continuation of the process of FIG. 5.

Accordingly, FIG. 6 illustrates a continuation of the process of FIG. 5. In FIG. 6, assume that AT B is currently tuned to a non-target carrier, such as carrier B, and that AT B missed the PTT call announcement and BOMs advertising the BCMCS flow associated with the PTT session. It is assumed that AT B wants to initiate the PTT session which is currently in progress. Thus, in 600 AT B sends a call request associated with the multicast session to the RAN 120, and the RAN 120 sends a call status message to AT B (e.g., indicating that the given multicast session is already in session). Based on the call status message, AT B determines that it is a "late joiner" to the announced multicast session, 610. In other words, AT B determines that any BOMs for the multicast session have already been sent. In 615, AT B sends a BCMCSFlowRegistration message to the RAN 120 in order to prompt the RAN 120 to send another BOM in carrier B that will inform AT B as to which carrier is hosting the given multicast session. In 620, the RAN 120 responds to the BCMCSFlowRegistration message with another BOM in carrier B that indicates, to AT B, to tune to carrier C in order to participate in the multicast session. In an example, the BOM sent by the RAN 120 in 620 can be sent on an earlier available synchronous control channel capsule, an earlier available subsynchronous control channel capsule and/or an earliest available asynchronous control channel capsule.

Thus, AT B tunes to carrier C, 625, and receives a subsequent BOM, 630, indicating an IM pair carrying multicast messages for the active multicast session, 635, begins monitoring the multicast session, 640, and continues to monitor the multicast session while receiving subsequent BOMs on the BOM interval in carrier C, 645, 650.

Also, while not shown explicitly within FIG. 6, the RAN 120 resets the BOM counter (i.e., from FIG. 5) before sending the BOM in 620, and increments the BOM counter after sending the BOM in 620. Next, in 650, the RAN 120 compares the BOM counter to the BOM threshold to determine whether the BOM threshold is exceeded. For convenience of explanation, assume the BOM counter is determined to exceed the BOM threshold in 650, and the RAN 120 stops sending BOMs for the given multicast session on carrier B in 655.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, aspects of embodiments of the invention can include logical implementations of the functions described herein. Accordingly, those skilled in the art will appreciate that embodiments of the invention are not limited to the examples provided herein.

The methods, sequences and/or algorithms described in connection with the embodiments disclosed herein may be embodied directly in hardware, in a software module executed by a processor, or in a combination of the two. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Accordingly, an embodiment of the invention can include a computer-readable medium including code stored thereon for supporting a multicast session in a wireless communications network, comprising: program code for receiving, from an access terminal, a request to register for a given multicast session, the access terminal being allocated a traffic channel on a first carrier; program code for determining whether the given multicast session is not being carried on the first carrier; and program code for transmitting a traffic channel assignment message allocating the access terminal a traffic channel on a second carrier if the determining step determines that the given multicast session is not being carried on the first carrier. Further, any of the functions describe herein can be included in as additional code in further embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of advertising a multicast session within a wireless communications network, comprising:
    periodically sending a message advertising an announced multicast session on each of a plurality of carriers, the message indicating that the announced multicast session is being carried on a target carrier among the plurality of carriers;
    determining whether to cease transmission of the periodic message within each non-target carrier of the plurality of carriers based on a number of times the periodic message has been sent in each of the plurality of carriers; and
    ceasing transmission of the periodic message within each non-target carrier of the plurality of carriers based on the determining step.

2. The method of claim 1, wherein the determining step includes:
    comparing the number of times the periodic message has been sent in each of the plurality of carriers with a given threshold value; and
    determining to cease transmission of the periodic message within each non-target carrier if the comparing step indicates that the number of times the periodic message has been sent is greater than the given threshold value.

3. The method of claim 1, wherein the periodic message is a broadcast overhead message (BOM).

4. The method of claim 1, wherein the ceasing step ceases transmission of the periodic message within each non-target carrier for the duration of the announced multicast session.

5. The method of claim 1, wherein the ceasing step ceases transmission of the periodic message within each non-target carrier after a given number of periodic sending steps.

6. The method of claim 1, wherein the first two periodically sent messages are sent on the two earliest available control channel capsules of a downlink control channel.

7. The method of claim 6, wherein the two earliest available control channel capsules include two synchronous control channel capsules, two sub-synchronous control channel capsules of the downlink control channel or one synchronous control channel capsule and one sub-synchronous control channel capsule.

8. The method of claim 1, wherein, in the target carrier, the periodically sent message indicates an interlace-multiplex pair on the target carrier that is carrying media associated with the announced multicast session, and, within each non-target carrier, the periodically sent message indicates the target carrier.

9. The method of claim 1, further comprising:
    receiving, after the ceasing transmission step, from an access terminal, a request for an access network to retransmit the periodic message; and
    re-transmitting the periodic message at least once on a carrier to which the access terminal is tuned.

10. The method of claim 9, wherein the re-transmitting step repeats the periodically repeating step, the determining step and the ceasing step within the carrier to which the access terminal is tuned.

11. An access network, comprising:
    means for periodically sending a message advertising an announced multicast session on each of a plurality of carriers, the message indicating that the announced multicast session is being carried on a target carrier among the plurality of carriers;
    means for determining whether to cease transmission of the periodic message within each non-target carrier of the plurality of carriers based on a number of times the periodic message has been sent in each of the plurality of carriers; and
    means for ceasing transmission of the periodic message within each non-target carrier of the plurality of carriers based on the determination of the means for determining.

12. The access network of claim 11, wherein the means for determining includes:
    means for comparing the number of times the periodic message has been sent in each of the plurality of carriers with a given threshold value; and
    means for determining to cease transmission of the periodic message within each non-target carrier if the comparison indicates that the number of times the periodic message has been sent is greater than the given threshold value.

13. The access network of claim 11, wherein the means for periodically sending the message sends the first two periodically sent messages on the two earliest available control channel capsules of a downlink control channel.

14. The access network of claim 11, wherein, in the target carrier, the periodically sent message indicates an interlace-multiplex pair on the target carrier that is carrying media associated with the announced multicast session, and, within each non-target carrier, the periodically sent message indicates the target carrier.

15. The access network of claim 11, further comprising:
    means for receiving, after the means for ceasing ceases transmission, a request from an access terminal for the access network to retransmit the periodic message; and
    means for re-transmitting the periodic message at least once on a carrier to which the access terminal is tuned.

16. An access network, comprising:
    logic configured to periodically send a message advertising an announced multicast session on each of a plurality of carriers, the periodically sent message indicating that the announced multicast session is being carried on a target carrier among the plurality of carriers;
    logic configured to determine whether to cease transmission of the periodic message within each non-target carrier of the plurality of carriers based on a number of times the periodic message has been sent in each of the plurality of carriers; and
    logic configured to cease transmission of the periodic message within each non-target carrier of the plurality of carriers based on the determination of the logic configured to determine.

17. The access network of claim 16, wherein the logic configured to determine includes:
    logic configured to compare the number of times the periodic message has been sent in each of the plurality of carriers with a given threshold value; and
    logic configured to determine to cease transmission of the periodic message within each non-target carrier if the comparison indicates that the number of times the periodic message has been sent is greater than the given threshold value.

18. The access network of claim 16, wherein the logic configured to periodically send sends the first two periodically sent messages on the two earliest available control channel capsules of a downlink control channel.

19. The access network of claim 16, wherein, in the target carrier, the periodically sent message indicates an interlace-multiplex pair on the target carrier that is carrying media associated with the announced multicast session, and, within each non-target carrier, the periodically sent message indicates the target carrier.

20. The access network of claim 16, further comprising:
   logic configured to receive, after the logic configured to cease ceases transmission, a request from an access terminal for the access network to retransmit the periodic message; and
   logic configured to re-transmit the periodic message at least once on a carrier to which the access terminal is tuned.

21. A non-transitory computer-readable medium including program code stored thereon, the program code configured to operate within a wireless communications system including an access network, comprising:
   program code to periodically send a message advertising an announced multicast session on each of a plurality of carriers, the message indicating that the announced multicast session is being carried on a target carrier among the plurality of carriers;
   program code to determine whether to cease transmission of the periodic message within each non-target carrier of the plurality of carriers based on a number of times the periodic message has been sent in each of the plurality of carriers; and
   program code to cease transmission of the periodic message within each non-target carrier of the plurality of carriers based on the determination of the program code to determine.

22. The non-transitory computer-readable medium of claim 21, wherein the program code to determine includes:
   program code to compare the number of times the periodic message has been sent in each of the plurality of carriers with a given threshold value; and
   program code to determine to cease transmission of the periodic message within each non-target carrier if the comparison indicates that the number of times the periodic message has been sent is greater than the given threshold value.

23. The non-transitory computer-readable medium of claim 21, wherein the program code to periodically send sends the first two periodically sent messages on the two earliest available control channel capsules of a downlink control channel.

24. The non-transitory computer-readable medium of claim 21, wherein, in the target carrier, the periodically sent message indicates an interlace-multiplex pair on the target carrier that is carrying media associated with the announced multicast session, and, within each non-target carrier, the periodically sent message indicates the target carrier.

25. The non-transitory computer-readable medium of claim 21, further comprising:
   program code to receive, after the program code to cease ceases transmission, a request from an access terminal for the access network to retransmit the periodic message; and
   program code to re-transmit the periodic message at least once on the target carrier to which the access terminal is tuned.

* * * * *